3,319,400
APPARATUS FOR LIQUID-TO-LIQUID HEAT EXCHANGE
John F. Wilson, New Berlin, and Howard W. Yant, Milwaukee, Wis., assignors to Allis-Chalmers Manufacturing Company, Milwaukee, Wis.
Filed May 24, 1965, Ser. No. 457,987
3 Claims. (Cl. 55—255)

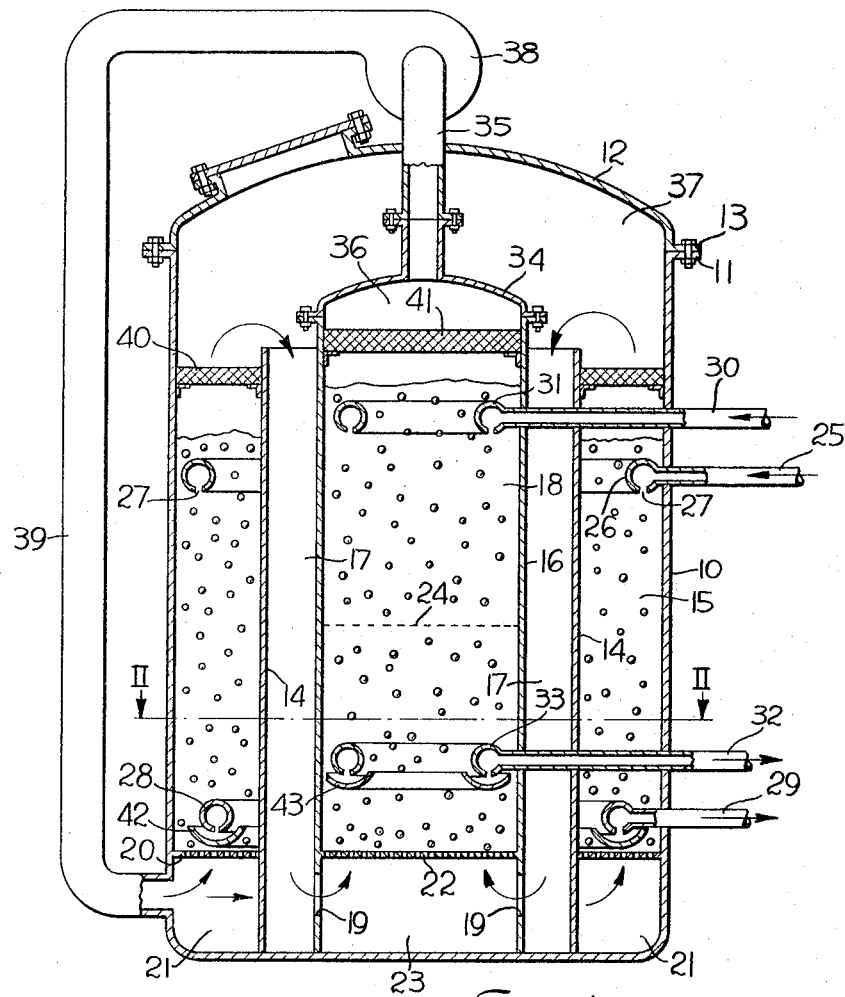
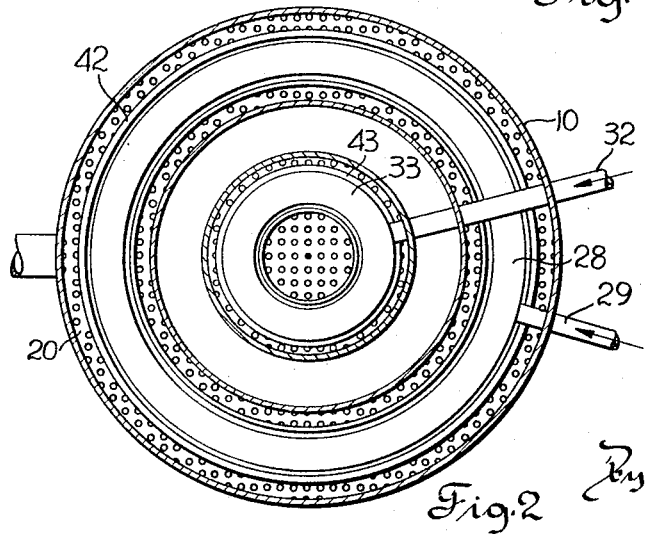
Fig. 1
Fig. 2
Inventors
John F. Wilson
Howard W. Ayant
By Forest C. Sutton
Attorney United States Patent Office 3,319,400
Patented May 16, 1967

This invention relates generally to heat exchangers. More specifically, this invention relates to a new and improved liquid-to-liquid heat exchanger which utilizes a gaseous phase as an intermediary heat transfer media to eliminate metallic heat transfer surfaces and to eliminate the need for bringing the two liquids into direct contact.

It is well known in the heat transfer art that the conventional type heat exchangers, such as the shell and tube, are not desirable for use in heating saline water, or any liquid containing dissolved solids, especially if substantially elevated temperatures are involved. The reason for this is that in such conventional heat exchangers, the heat transfer is conducted across the metallic interfaces which isolate the hot and cold liquids or phases. Thus, when a solution such as saline water is heated in such a heat exchanger, salt and other dissolved minerals are deposited upon the metallic interfaces. In a short period of time, such scale deposit will build up causing substantial reductions in heat transfer coefficients and even causing flow restrictions.

Because of such inherent disadvantages in these more conventional type heat exchangers, the prior art has developed various types of direct contact heat exchangers such as the spray column, packed column and two phase contactor which are better suited to heating liquids containing dissolved solids. In these types of heat exchangers, the hot and cold liquids are brought into direct contact with each other in countercurrent flow paths whereby heat transfer is effected directly across the liquid interfaces where the two liquids are in contact. Therefore, the direct contact heat exchangers do not have metallic heat transfer surfaces to collect scale and deposits. Furthermore, elimination of such metallic interfaces usually results in higher heat transfer coefficients.

Despite the obvious advantages of the direct contact heat exchangers, they do present some major disadvantages which can completely preclude their use in some applications. For example, it is readily apparent that the two liquids in contact must be completely immiscible and should have substantially different densities so that the two liquids can be easily separated after the heat transfer is effected. Further, the solubility of one liquid in the other should be as small as possible to prevent contamination and losses. Even when all these conditions are met in actual practice, complete separation of the two liquids is not easily achieved. That is, tiny droplets of one liquid are commonly carried away in the bulk of the other liquid. Such contamination, though slight, may seriously affect some processes to the point of being completely intolerable.

This invention is predicated upon the discovery and development of a new and improved liquid-to-liquid heat exchanger which utilizes a gaseous phase as an intermediary heat transfer media so that heat exchange may be effected without the presence of metallic heat transfer surfaces, and without bringing the two liquids into direct contact.

Accordingly, it is a prime object of this invention to provide a liquid-to-liquid heat exchanger wherein a gaseous phase is passed through one liquid and then the other to effect the heat transfer without bringing the two liquids into direct contact.

It is another primary object of this invention to provide a liquid-to-liquid heat exchange wherein metallic heat transfer surfaces are eliminated and wherein the two liquids are not brought into direct contact.

It is still another primary object of this invention to provide a liquid-to-liquid heat exchanger wherein the two liquids are not separated by metallic heat transfer surfaces and yet the two liquids need not be immiscible, different in density, nor insoluble in each other.

It is yet another primary object of this invention to provide a liquid-to-liquid heat exchanger especially adapted to heating liquids containing dissolved solids.

It is a further primary object of this invention to provide a liquid-to-liquid heat exchanger which will not contaminate one liquid with the other.

These and other objects and advantages are fulfilled by this invention, various novel features of which will become apparent from an understanding of the following detailed description and accompanying drawings.

Referring to the drawings:
FIG. 1 is a cross sectional, elevational view of the heat exchanger employing the principal concepts and novel features of the invention herein described, and
FIG. 2 is a cross sectional top view taken along line II—II of FIG. 1.

Referring again to the drawings, one embodiment of this invention comprises an upright, closed cylindrical vessel 10, having a flange portion 11. A dome or closure top 12 having a flange 13 is secured over vessel 10 to seal said vessel.

A cylindrical wall 14 is concentrically disposed within vessel 10, rigidly secured to the bottom of said vessel, forming an outer annular chamber 15 between the cylindrical wall 14 and the cylindrical walls of vessel 10. A second cylindrical wall 16 is concentrically disposed within cylindrical wall 14 rigidly secured to the bottom of vessel 10, forming an inner annular chamber 17 and a central chamber 18. Wall 16 is provided with holes or passageways 19 in the lower portion thereof to allow passage between the lower portions of the inner annular chamber 17 and the central chamber 18. Cylindrical wall 14, however, is solid so that no passage exists between the two annular chambers 15 and 17 except over the top of wall 14.

An annular grid plate or screen 20 is horizontally disposed near the bottom of the outer annular chamber 15 dividing said chamber 15 into an upper portion and a lower portion or air chamber 21. Similarly, a circular grid plate or screen 22 is horizontally positioned near the bottom of central chamber 18, dividing said chamber 18 into an upper portion and a lower portion or air chamber 23. One or more additional grid plates or screens 24 are horizontally disposed in the upper portion of the central chamber 18.

A hot liquid inlet pipe 25 penetrates the wall of vessel 10 feeding into a ring pipe 26 concentrically disposed within the upper portion of the outer annular chamber 15. Ring pipe 26 is provided with uniformly distributed holes 27 to uniformly admit hot liquid into the annular chamber 15. A second ring pipe 28, similarly provided with a plurality of uniformly distributed holes is concentrically disposed in the lower portion of the annular chamber 15 above the grid plate 20 to extract the liquid from said annular chamber 15. Ring pipe 28 feeds into outlet pipe 29 which carries the heat exchange liquid from vessel 10.

An inlet pipe 30 penetrates vessel 10 and walls 14 and 16 to admit the cold liquid to be heated into the heat exchanger. This liquid is uniformly distributed within central chamber 18 through ring pipe 31 located in the upper portion of chamber 18. Similarly, outlet pipe 32 penetrates walls 14 and 16 and the wall of vessel 10 to remove the heated liquid from the lower part of chamber 18 which is uniformly collected through ring pipe 33.

A dome or closure cover 34, fitted with an exhaust pipe 35, is secured to the upper end of cylindrical wall 16, so that the air space 36 above the central chamber 18 is isolated from the air space 37 above the annular chambers 15 and 17. A blower 38 is provided to extract the air from the air space 36 through pipe 35 and blow said air into the annular air chamber 21 via pipe 39.

An annular shaped demister 40 is horizontally disposed at the extreme upper end of the annular chamber 15. Such demisters commonly consist of a metallic mesh which allows gases to pass therethrough while exposing said gases to a large metallic surface area. Such demisters are well known in the art for extracting moisture from gases passing therethrough. Therefore, such demisters need not be further described here. Similarly, a circular demister 41 is horizontally disposed near the extreme upper end of chamber 18.

Deflector shields 42 and 43 may be provided around outlet ring pipe 28 and outlet pipe 33 respectively, to prevent air bubbles in the two liquids from being extracted from the heat exchanger with said liquids.

In operation, the hot heat transfer liquid is continuously admitted into the heat exchanger through inlet pipe 25. The ring pipe 26 uniformly distributes this hot liquid within the upper portion of annular chamber 15 below the demister 40. Cool air is continuously bubbled up through the heat transfer liquid in a countercurrent relationship whereby the air is heated and the liquid cooled. The cooled liquid is then uniformly and continuously collected in the outlet ring pipe 28 and passed out of the heat exchanger through outlet pipe 29. In a like manner, the liquid to be heated is continuously admitted into the central chamber 18 below demister 41 through pipe 30 and ring pipe 31. In this chamber the air, previously heated in chamber 15, is bubbled up through the cool liquid in countercurrent relationship whereby the liquid is heated and the air cooled. The heated liquid is continuously extracted from the heat exchanger through outlet pipe 32 at ring pipe 33.

The air circulation as described above is forced by blower 38 which extracts cool air from the air space 36 above central chamber 18 and blows it into the annular air chamber 21 via pipe 39. The pressure created by the blower forces the air through the holes in the grid plate 20 whereupon the air bubbles up through the heat transfer liquid as explained above, cooling the liquid and heating the air. The hot air, emerging from the heat transfer liquid, passes upward through the demister 40, which removes entrained moisture therefrom, and into air space 37. This hot gas then passes downward through the annular chamber 17 and into air chamber 23. From chamber 23, the hot air passes upward through grid plate 22 and bubbles up through the liquid in chamber 18 heating the liquid therein. Thereafter, the cooled air passes through the demister 41 where moisture is removed, and into air space 36. Then the cycle is repeated.

In the heat exchanger described above, all of the primary heat transfer is effected across the air-liquid interface. In the first instance heat is transferred from the heat transfer liquid in the annular chamber 15 to the air bubbling therethrough. Subsequently, this heated air transfers heat to the second liquid in chamber 18. Therefore, the two liquids are not brought into direct contact, and thus there can be little or no contamination of one liquid in the other. Furthermore, since the two liquids are not brought into direct contact, there is no problem in separating the two liquids after heat transfer, and accordingly the two liquids may be basically the same. For example, they may both be aqueous as a hot pure water transferring heat to a saline water. In this example, any carry over of heat transfer water into the saline water would not be considered contamination.

Although there may be some metallic heat transfer surfaces, namely the surfaces of walls 14 and 16, such heat transfer effects are only secondary and are not essential to the system. Thus, even though scale and deposits may form on the surfaces of these walls, such deposits would not interfere with the primary heat transfer surfaces, namely the air-liquid interfaces.

It is apparent that efforts would have to be made to keep the liquids in chambers 15 and 18 from draining through grid plates 21 and 23 respectively. This can be done by keeping the holes or openings in the grid plates reasonably small at say about from 1/8 to 1/4 inch diameter, and by maintaining an air pressure in air chambers 21 and 23 which is greater than the hydrostatic pressures of the respective liquids. Thus the air pressure in the system will depend directly upon the height of the liquid columns in the two chambers. On the other hand, slight drainage into air chambers 21 and 23 would not be a problem as long as the air paths are not completely blocked.

It may be desirable to provide drain plugs so that the liquids in chambers 15 and 18 can be removed therefrom prior to shutting down the system. Then upon restart-up, the air circulation and pressure can be started first. Then when the liquids are admitted, there will be little or no drainage. However, even if the air circulation should be stopped while there are liquids in the two chambers 15 and 18, there still would be no serious complications. The liquid in chamber 15 would partially drain into air chamber 21 and the liquid in chamber 18 would partially drain into air chamber 23 and annular chamber 17, and the two liquids not come into contact. Then on restart-up, the air pressure would force the two liquids back up into chambers 15 and 18.

Since the air bubbles rising in the cylindrical chamber 18 may have a tendency to channel in the center of the chamber, it may be necessary to provide one or more grid plates or screens 24. Such screens would tend to cause the air bubbles to spread and stay small. The number of screens would vary depending upon the overall height of the liquid column. Such screens or grid plates would not ordinarily be necessary in the annular chamber 15.

It is conceivable that some gas other than air could be used as the heat transfer intermediary, as for example carbon dioxide or helium which do possess higher heat transfer coefficients. However, these gases would add considerable expense to the system.

Further modifications in the above described heat exchanger could be made without departing from the spirit of the invention. For example, the inlet and outlet pipes 31 and 33 respectively could be redesigned to provide a more uniform distribution and collection of liquid within chamber 18. Furthermore, it is not essential that one liquid chamber be concentric around the other. For example, both chambers could be separate vessels of any shape with appropriate piping therebetween. If separate vessels are provided, it would of course be necessary that their relative elevation be such that the liquid in one vessel cannot drain into the other, and that neither vessel can drain into the blower. It is also possible to completely eliminate the perforated grid plates in most designs and let the air bubbles into the liquids laterally from pipe 39 and holes 19. If this were done however, the efficiency of the system would be impaired since the bubbles would rise adjacent to the outer walls of the two liquid chambers and would not be uniformly distributed throughout the liquids.

It should also be apparent that the relative position of the two liquids could be reversed within the heat exchanger embodiment detailed herein. That is, the hot heat exchange liquid could be circulated through the central chamber. All that is necessary is that the air or gas be bubbled first through one liquid and then the other.

Accordingly, it should be understood that this invention should not be limited to the details given herein, but may be modified within the scope of the appending claims.

The embodiments of the invention in which an exclusive property or privilege is claimed are defined as follows:

1. A liquid-to-liquid heat exchanger comprising in combination; a closed vessel, a first wall member disposed within said vessel, secured at the bottom thereof, forming an outer liquid chamber between said well member and the wall of said vessel, a second wall member disposed within the first wall member, forming an inner liquid chamber therein, and forming an air space between said wall members, a first perforated grid plate horizontally disposed in said outer liquid chamber, dividing said outer liquid chamber into an upper portion and a lower portion, a second perforated grid plate horizontally disposed within said inner liquid chamber dividing said inner liquid chamber into an upper portion and a lower portion, a passage provided from said air space into said lower portion of the inner liquid chamber, a passage provided from said outer liquid chamber to said air space over the top of said first wall member, means for admitting a hot liquid into the upper portion of said outer liquid chamber, means for extracting said liquid from said upper portion of said outer liquid chamber, means for admitting a liquid to be heated into the upper portion of said inner liquid chamber, means for extracting the liquid from the upper portion of said inner liquid chamber, and a blower for extracting air from the upper portion of the inner liquid chamber and blowing it into the lower portion of the outer liquid chamber.

2. A liquid-to-liquid heat exchanger comprising in combination; a vertically disposed, closed cylindrical vessel, a first cylindrical wall member concentrically disposed within said vessel, secured at the bottom thereof, forming an outer annular chamber between said cylindrical wall member and the cylindrical wall of said vessel, a second cylindrical wall member concentrically disposed within the first cylindrical wall, forming a cylindrical chamber therein, and forming an inner annular chamber between said cylindrical wall members, a first perforated grid plate horizontally disposed in said outer annular chamber, dividing said outer annular chamber into an upper portion and a lower portion, a second perforated grid plate horizontally disposed within said cylindrical chamber dividing said cylindrical chamber into an upper portion and a lower portion, a passage provided from said inner annular chamber to said lower portion of the cylindrical chamber, a passage provided from said outer annular chamber to said inner annular chamber over the top of said first wall member, means for admitting a hot liquid into the upper portion of said outer annular chamber, means for extracting said liquid from said upper portion of said outer chamber, means for admitting a liquid to be heated into the upper portion of said cylindrical chamber, means for extracting the liquid from the upper portion of said cylindrical chamber, and a blower for extracting a gaseous phase from the upper portion of the cylindrical chamber and blowing it into the lower portion of the outer annular chamber.

3. A liquid-to-liquid heat exchanger comprising in combination; a vertically disposed, closed cylindrical vessel, a first cylindrical wall member concentrically disposed within said vesel, secured at the bottom thereof, forming an outer annular chamber between said cylindrical wall member and the cylindrical wall of said vessel, a second cylindrical wall member concentrically disposed within the first cylindrical wall, forming a cylindrical chamber therein, and forming an inner annular chamber between said cylindrical wall members, a first perforated grid plate horizontally disposed in said outer annular chamber, dividing said outer annular chamber into an upper portion and a lower portion, a second perforated grid plate horizontally disposed within said cylindrical chamber dividing said cylindrical chamber into an upper portion and a lower portion, a passage provided from said inner annular chamber to said lower portion of the cylindrical chamber, a passage provided from said outer annular chamber to said inner annular chamber over the top of said first wall member, means for uniformly distributing a hot liquid into the upper portion of said outer annular chamber adajacent to said first perforated grid plate, means for uniformly extracting said liquid from said upper portion of said outer annular chamber above said distributing means, an inlet pipe for admitting a liquid to be heated into the upper portion of said cylindrical chamber adjacent to said second perforated grid plate, an outlet pipe positioned above said inlet pipe for extracting the liquid from the upper portion of said cylindrical chamber, a blower for circulating a gaseous phase vertically upward through the outer annular chamber, vertically downward through the inner annular chamber and vertically upward through the cylindrical chamber, a first demister to remove entrained moisture from the air emerging from the outer annular chamber, and a second demister to remove entrained moisture from the air emerging from the cylindrical chamber.

References Cited by the Examiner
UNITED STATES PATENTS

| | | |
|---|---|---|
| 1,503,428 | 7/1924 | Morterud. |
| 2,749,094 | 6/1956 | Lewis et al. _____ 62—309 X |

HARRY B. THORNTON, *Primary Examiner.*

RONALD R. WEAVER, *Examiner.*